350-464
OR 3,737,215

United States
De Jager

[11] 3,737,215
[45] June 5, 1973

[54] SIX ELEMENT UNIT MAGNIFICATION LENS

[75] Inventor: Donald De Jager, Rochester, N.Y.

[73] Assignee: Eastman Kodak Company, Rochester, N.Y.

[22] Filed: Apr. 6, 1972

[21] Appl. No.: 241,572

[52] U.S. Cl.................................350/215, 350/210
[51] Int. Cl..............................................G02b 9/62
[58] Field of Search.....................................350/215

[56] References Cited
UNITED STATES PATENTS 3,519,333   7/1970   Takahashi......................350/215
3,608,452   9/1971   Conrad et al....................350/215 X̄

FOREIGN PATENTS OR APPLICATIONS 1,120,335   7/1968   Great Britain........................350/215

Primary Examiner—John K. Corbin
Attorney—W. H. J. Kline

[57] ABSTRACT

An asymmetrical lens of a modified Gauss type adapted for printing at unit magnification, comprising six air-spaced elements surrounding an aperture stop, with front and rear positive biconvex elements, front and rear positive meniscus elements concave toward the aperture stop and front and rear negative elements.

4 Claims, 6 Drawing Figures

PERCENT $f$

PERCENT $f$

SIX ELEMENT UNIT MAGNIFICATION LENS

BACKGROUND OF THE INVENTION

1. Field of the Invention

This invention relates to lenses and in particular to six element lenses of a modified Gauss type which are adapted for printing at unit magnification.

2. Description of the Prior Art

In the printing of microcircuits, the slightest defect in the design or the assembly of the lens may cause undesirable and noticeable effects in the fine line structure of the developed image. One technique used to achieve the high quality required in such lenses is to design the lens for use with specific wavelengths of light in order to minimize certain optical defects. Thus, image degradation caused by diffraction of light may be minimized by using short wavelength light. Similarly, image degradation caused by chromatic aberration may be minimized by using nearly monochromatic light. The light source usually used in the printing of microcircuits is a mercury vapor lamp, filtered to produce light with a wavelength of 4358 ± 100 Angstroms. With diffraction and chromatic aberration minimized by the use of nearly monochromatic short wavelength light, lens performance is determined by the corrections for other aberrations.

Many variations of modified Gauss type lenses which are symmetric and are designed for use at unit magnification are known in the prior art. U.S. Pat. No. 3,348,900 is an example of a six element modified Gauss type lens, which is symmetrical in design and which has its second and third elements and its fourth and fifth elements cemented together. U.S. Pat. No. 3,537,774 is an example of a seven element modified Gauss type lens in which airspaces have been incorporated between the second and third elements and between the fourth and fifth elements. This lens is also substantially symmetrical in design since the sixth and seventh elements are cemented. While lateral aberrations are minimized by a substantially symmetric design as in the cited patents, symmetry does not aid in reducing astigmatism or longitudinal spherical aberration.

SUMMARY OF THE INVENTION

An object of the present invention is to provide six element asymmetric lenses of a modified Gauss type which are adapted for use at unit magnification.

Another object of this invention is to provide such lenses which are well corrected for all aberrations and in particular are well corrected for astigmatism.

These and other objects are accomplished according to this invention by lenses of a modified Gauss type comprising six airspaced elements arranged from front to rear in the following order: (1) a front positive biconvex element, (2) a front positive meniscus element concave away from the front biconvex element, (3) a front negative element, (4) a rear negative element, (5) a rear positive meniscus element concave toward the rear negative element, and (6) a rear positive biconvex element.

In the preferred embodiments, each lens is adapted for use at unit magnification and is asymmetric. The asymmetry of each lens may be characterized by the ratio of the relative thicknesses of the negative elements $T_4/T_3$, by the ratio of the relative air spaces separating the positive meniscus and negative elements, $S_4/S_2$ and by the ratio of the relative air spaces separating the positive elements $S_5/S_1$. Correction of astigmatism to within 0.01 percent of the focal length along with good correction of other abberrations has been achieved with lenses which exhibit asymmetry as characterized by these ratios. In particular, a lens is produced which achieves high quality performance with exceptionally good correction of astigmatism when $T_4/T_3$ has a value between 2 and 5, while $S_4/S_2$ and $S_5/S_1$ each has a value between 1 and 9.

BRIEF DESCRIPTION OF THE DRAWINGS

In the detailed description of the preferred embodiments of the invention presented below, reference is made to the accompanying drawings in which.

DESCRIPTION OF THE PREFERRED EMBODIMENT

Figure 1:
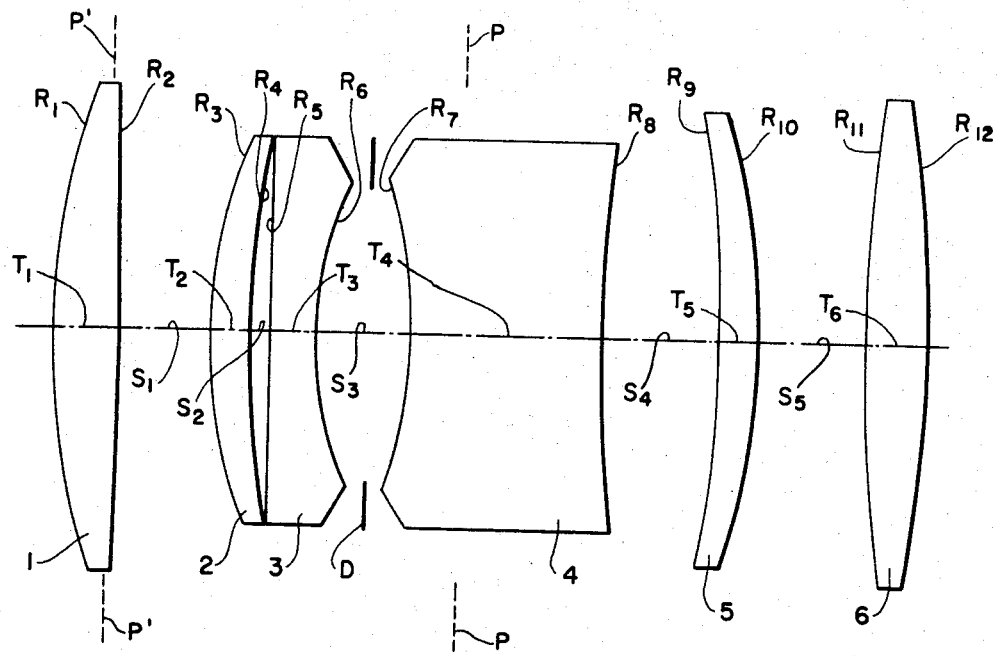
FIG. 1 is a diagrammatic cross section of a lens according to this invention corresponding to Example 1.
Figure 4:
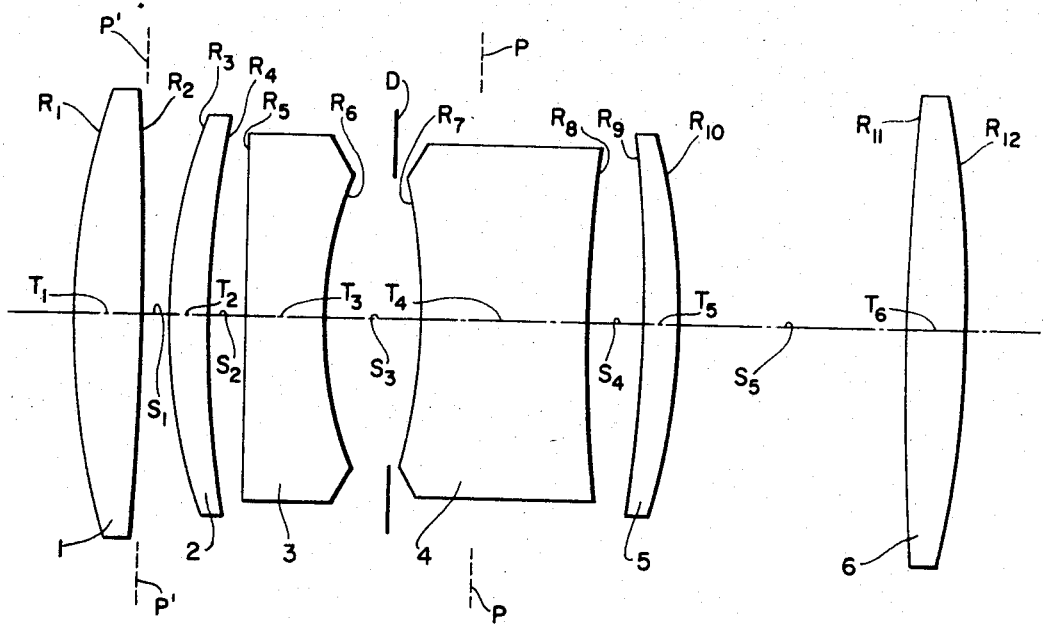
FIG. 4 is a diagrammatic cross section of a lens according to this invention corresponding to Example 3.

For all purposes of describing or claiming of the invention herein, the term lens will be used to describe the complete lens, and not the elements thereof. In FIGS. 1 and 4, the elements are numbered from left to right with Arabic numerals. In the examples, the elements, the indices of refraction N and Abbe numbers V for the 0.5876 micron Helium line of the spectrum, the radii of curvature R, the thicknesses T and the air spaces S are numbered by subscript to correspond with FIGS. 1 and 4. Radii of curvature having centers of curvature to the right of the surface are considered positive; those with centers of curvature to the left of the surface are considered negative. All parameters are based upon a lens equivalent focal length of 100 millimeters.

In all embodiments of the invention as illustrated in FIGS. 1 and 4, the lens comprises six air spaced elements surrounding an aperture stop D. Element 1 is a front positive biconvex element. Element 2 is a front positive meniscus element concave toward aperture stop D. Element 3 is a front negative element preceding aperture stop D. Element 4 is a rear negative element following aperture stop D. Element 5 is a rear positive meniscus element concave toward aperture stop D. Element 6 is a rear positive biconvex element.

Lenses may be made according to this invention by following the specifications in the preferred embodiments presented below.

EXAMPLE 1

F = 100mm    f/2.75

| Element | N | V | Radius mm | Thickness or Separation mm |
|---|---|---|---|---|
| 1 | 1.78831 | 47.4 | $R_1 = 51.804$ | $T_1 = 5.050$ |

| | | | Radius | Thickness or Separation |
|---|---|---|---|---|
| 2 | 1.73400 | 51.3 | $R_2 = -270.13$ | $S_1 = 6.714$ |
| | | | $R_3 = 38.733$ | $T_2 = 3.158$ |
| | | | $R_4 = 86.041$ | $S_2 = 1.060$ |
| 3 | 1.62588 | 35.7 | $R_5 = \infty$ | $T_3 = 3.523$ |
| | | | $R_6 = 28.146$ | $S_3 = 6.643$ |
| 4 | 1.69895 | 30.1 | $R_7 = -39.814$ | $T_4 = 14.517$ |
| | | | $R_8 = 156.48$ | $S_4 = 8.189$ |
| 5 | 1.73400 | 51.3 | $R_9 = -112.62$ | $T_5 = 3.065$ |
| | | | $R_{10} = -53.643$ | $S_5 = 8.474$ |
| 6 | 1.71300 | 53.9 | $R_{11} = 176.61$ | $T_6 = 4.530$ |
| | | | $R_{12} = -91.830$ | |

The lens design of Example 1 is illustrated in FIG. 1. In this Figure, D denotes the aperture stop, P denotes the entrance pupil and P' denotes the exit pupil, for light traveling from left to right. The distance from the object to surface 1 is 155.46 millimeters and this distance is very nearly equal, at unit magnification, to the distance from surface 12 to the image which is 157.06 millimeters.

The entrance pupil P is located near the physical center of the lens. However, the exit pupil P' is located near the left end of the lens as may be seen in FIG. 1. The distance from the object to the entrance pupil is therefore substantially less than the distance from the exit pupil to the image. As a result, even though the object and image are equal in size and very nearly equidistant from the outer surfaces of the lens, the object subtends a somewhat greater angular field with respect to the entrance pupil than does the image with respect to the exit pupil. This is one of the noticeable examples of asymmetry in the properties of the lens that may be seen by an observer who is unaware of the details of the internal construction of the lens.

The internal design of the lens is also asymmetric as may be seen in the relative thicknesses of elements 3 and 4 and the lack of symmetry of the air spaces to the left of aperture stop D with respect to the corresponding air spaces to the right of aperture stop D. The asymmetric design of elements 3 and 4 may be characterized by the ratio of their thicknesses, $T_4/T_3$. The asymmetry of the air spaces on opposite sides of aperture stop D may be characterized by the ratios of the corresponding air spaces, $S_5/S_1$ and by $S_4/S_2$. In the lens of Example 1, these thickness and air space ratios are:

$(T_4/T_3) = 4.13$ ; $(S_5/S_1) = 1.26$ ; $(S_4/S_2) = 7.72$

Figure 2:
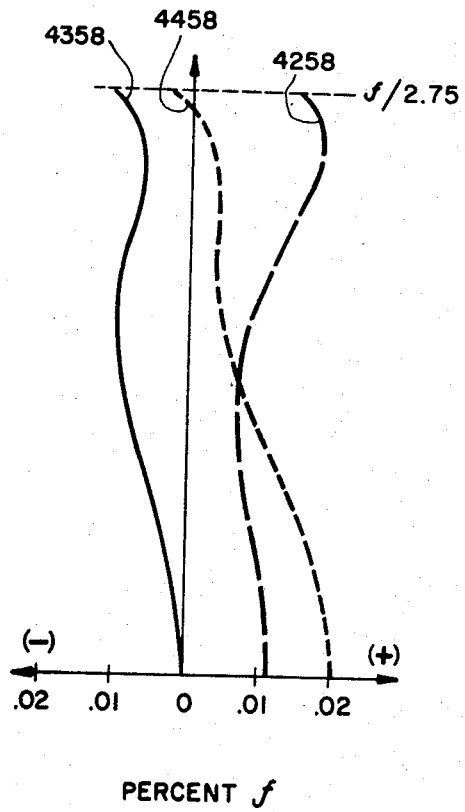
FIG. 2 is a graph showing longitudinal spherical abberration in each of three wavelengths for the lens of FIG. 1.
Figure 3:
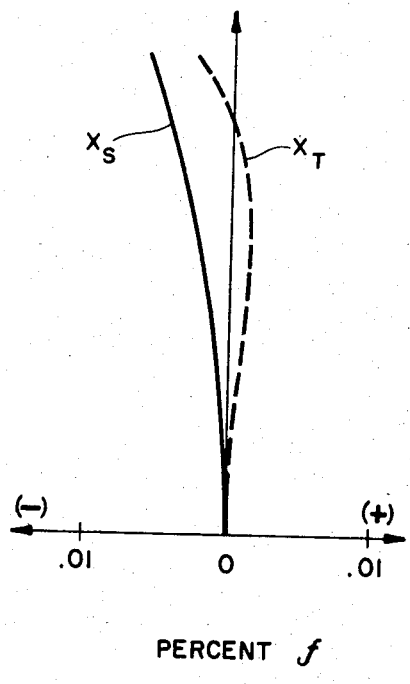
FIG. 3 is a graph showing sagittal and tangential astigmatism for the lens of FIG. 1.

The optical aberrations of the lens of Example 1 are shown in FIGS. 2 and 3. In FIG. 2, the longitudinal spherical aberration as a percentage of the focal length of the lens is plotted horizontally, versus height at the entrance pupil which is plotted vertically. The relative aperture indication of f/2.75 in FIG. 2 is the equivalent aperture; the effective f-number is 5.5 in both object and image spaces. The spherical aberration is shown at three wavelengths: 4258, 4358, and 4458 Angstroms, which represents the band width of the substantially monochromatic short wavelength light source with which this lens is designed to be used. To those knowledgeable in the art, it will be clear that the lens is properly corrected for longitudinal color over this wavelength region. The maximum longitudinal spherical aberration at the primary wavelength of 4358 Angstroms is extremely small, being only 0.011 percent of the focal length. FIG. 3 represents the sagittal and tangential astigmatism as a percentage of the focal length calculated along the chief rays in the principal wavelength of 4358 Angstroms according to Coddington's formula, plotted horizontally, versus the angle at the entrance pupil plotted vertically. Note that the maximum astigmatism, at 3.3°, is only 0.006 percent of the focal length, an extraordinarily small value.

The lens of Example 1 was designed for use with glasses whose indices of refraction exactly match those given in standard optical glass catalogs. In the following Example 2, a different glass type was used in elements 2 and 5 and the lens was optimized for use with actual glass samples whose measured indices of refraction differed slightly from those given in optical glass catalogs.

EXAMPLE 2

F = 100mm    f/2.75

| Element | N | V | Radius mm | Thickness or Separation mm |
|---|---|---|---|---|
| 1 | 1.78821 | 47.5 | $R_1 = 52.093$ | $T_1 = 5.080$ |
| | | | $R_2 = -266.30$ | $S_1 = 6.862$ |
| 2 | 1.73252 | 51.7 | $R_3 = 38.752$ | $T_2 = 3.135$ |
| | | | $R_4 = 85.900$ | $S_2 = 0.983$ |
| 3 | 1.62552 | 35.8 | $R_5 = \infty$ | $T_3 = 3.619$ |
| | | | $R_6 = 28.267$ | $S_3 = 6.483$ |
| 4 | 1.69864 | 30.1 | $R_7 = -39.834$ | $T_4 = 14.332$ |
| | | | $R_8 = 158.81$ | $S_4 = 8.495$ |
| 5 | 1.73252 | 51.7 | $R_9 = -113.08$ | $T_5 = 3.053$ |
| | | | $R_{10} = -53.670$ | $S_5 = 8.202$ |
| 6 | 1.71324 | 54.0 | $R_{11} = 177.80$ | $T_6 = 4.515$ |
| | | | $R_{12} = -92.566$ | |

This lens is also adapted for unit magnification with substantially equal conjugates of 155.60 and 157.33 millimeters for object and image. The asymmetric nature of the lens of Example 2 may be characterized by the following thickness and air space ratios as defined hereinbefore:

$(T_4/T_3) = 3.96$ ; $(S_5/S_1) = 1.19$ ; $(S_4/S_2) = 8.64$

This lens is also well corrected for longitudinal color as well as having a maximum astigmatism, at 3.3°, of only 0.007 percent of the focal length.

Example 3, illustrated in FIG. 4, utilizes the same glasses as the lens of Example 1. However, as may be seen from FIG. 4, elements 3 and 4 are more nearly equal in thickness than in the lens of FIG. 1 and the relative air spaces $S_5$ and $S_1$ are more unequal.

EXAMPLE 3

F = 100mm    f/2.75

| Element | N | V | Radius | Thickness or Separation mm |
|---|---|---|---|---|
| 1 | 1.78831 | 47.4 | $R_1 = 53.240$ | $T_1 = 5.130$ |
| | | | $R_2 = -248.90$ | $S_1 = 1.975$ |
| | | | $R_3 = 41.102$ | |

| | | | | |
|---|---|---|---|---|
| 2 | 1.73400 | 51.3 | $R_4 = 84.269$ | $T_2 = 3.080$ |
| | | | $R_5 = 1505.0$ | $S_2 = 2.740$ |
| 3 | 1.62588 | 35.7 | $R_6 = 27.657$ | $T_3 = 6.003$ |
| | | | $R_7 = -38.719$ | $S_3 = 7.411$ |
| 4 | 1.69895 | 30.1 | $R_8 = 202.20$ | $T_4 = 12.888$ |
| | | | $R_9 = -113.07$ | $S_4 = 3.677$ |
| 5 | 1.73400 | 51.3 | $R_{10} = -48.741$ | $T_5 = 2.823$ |
| | | | $R_{11} = 196.55$ | $S_5 = 16.881$ |
| 6 | 1.71300 | 53.8 | $R_{12} = -92.355$ | $T_6 = 4.394$ |

This lens is also adapted for unit magnification with conjugates of 157.16 and 152.43 for object and image, respectively. The asymmetric nature of the lens of Example 3 may be characterized by the following thickness and air space ratios as defined hereinbefore:

$$(T_4/T_3) = 2.15 \; ; \; (S_5/S_1) = 8.55 \; ; \; (S_4/S_2) = 1.34$$

Figure 5:
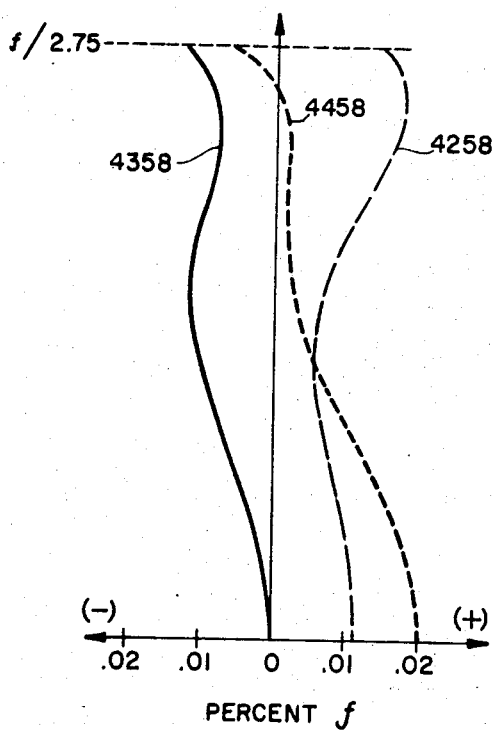
FIG. 5 is a graph showing longitudinal spherical abberation in each of three wave lengths for the lens of FIG. 4.
Figure 6:
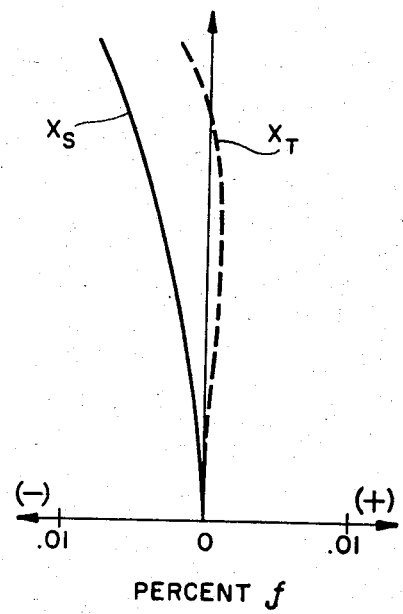
FIG. 6 is a graph showing sagittal and tangential astigmatism for the lens of FIG. 4.

The optical aberrations of the lens of Example 3 are shown in FIGS. 5 and 6, which correspond in meaning to FIGS. 2 and 3. The maximum longitudinal spherical aberration at the primary wavelength of 4358 Angstroms is seen to be 0.013 percent of the focal length. The maximum astigmatism is seen in FIG. 6 to be 0.008 percent of the focal length.

Exceptionally good correction of astigmatism along with good correction of other aberrations has been achieved in lenses according to this invention which are characterized by asymmetry in the thicknesses of the negative elements and in the relative spacing of the elements within the lens. In particular, correction of astigmatism to within 0.01 percent of the focal length along with good correction of other aberrations has been achieved in lenses in which the asymmetry ratios fall within the following ranges:

$$2 \leq (T_4/T_3) \leq 5$$
$$1 < (S_4/S_2) \leq 9$$
$$1 < (S_5/S_1) \leq 9$$

The invention has been described in detail with particular reference to preferred embodiments thereof, but it will be understood that variations and modifications can be effected within the spirit and scope of the invention. In particular, it should be understood that throughout this description it is assumed that light is traveling from left to right through the lenses illustrated in FIGS. 1 and 4. Because the object and image distances are substantially the same, the object and image positions may be interchanged. With the object on the right, light would pass from right to left through the lenses as illustrated in FIGS. 1 and 4 and the entrance pupil would be physically located near the left end of the lens while the exit pupil would be located near the center of the lens. However, the thickness and air space ratios described hereinbefore will lie within the ranges already disclosed, as these ratios are not dependent upon the direction of passage of the light through the lens, but upon the relative size and spacing of the lens elements.

I claim

1. A lens comprising six air spaced elements, said elements being, in consecutive order, a first positive biconvex element, a first positive meniscus element concave away from said first biconvex element, a first negative element, a second negative element, a second positive meniscus element concave toward said second negative element and a second positive biconvex element, wherein:
   the ratio of the thickness of said second negative element to said first negative element has a value between 2.0 and 5.0;
   the ratio of the air space separating said second negative and said second positive meniscus elements to the air space separating said first negative and said first positive meniscus elements has a value between 1.0 and 9.0; and
   the ratio of the air space separating said second positive elements to the air space separating said first positive elements has a value between 1.0 and 9.0.

2. A lens comprising, from front to rear, a positive biconvex element, a positive meniscus element concave to the rear, a negative element, an aperture stop, a negative element, a positive meniscus element concave to the front and a positive biconvex element, said lens having an equivalent focal length of 100 millimeters when constructed according to the parameters in the following table:

| Element | N | V | Radius mm | Thickness or Separation mm |
|---|---|---|---|---|
| 1 | 1.78831 | 47.4 | $R_1 = 51.804$ | $T_1 = 5.050$ |
| | | | $R_2 = -270.13$ | $S_1 = 6.714$ |
| 2 | 1.73400 | 51.3 | $R_3 = 38.733$ | $T_2 = 3.158$ |
| | | | $R_4 = 86.041$ | $S_2 = 1.060$ |
| 3 | 1.62588 | 35.7 | $R_5 = \infty$ | $T_3 = 3.523$ |
| | | | $R_6 = 28.146$ | $S_3 = 6.643$ |
| 4 | 1.69895 | 30.1 | $R_7 = -39.814$ | $T_4 = 14.517$ |
| | | | $R_8 = 156.48$ | $S_4 = 8.189$ |
| 5 | 1.73400 | 51.3 | $R_9 = -112.62$ | $T_5 = 3.065$ |
| | | | $R_{10} = -53.643$ | $S_5 = 8.474$ |
| 6 | 1.71300 | 53.9 | $R_{11} = 176.61$ | $T_6 = 4.530$ |
| | | | $R_{12} = -91.830$ | | wherein, from front to rear, the lens elements are numbered from 1-6, the corresponding indices of refraction, N, and Abbe numbers, V, are for the 0.5876 micron Helium line of the spectrum, the radii are numbered from $R_1$ to $R_{12}$, the thicknesses are numbered from $T_1$ to $T_6$ and the air spaces are numbered from $S_1$ to $S_5$.

3. A lens comprising, from front to rear, a positive biconvex element, a positive meniscus element concave to the rear, a negative element, an aperture stop, a negative element, a positive meniscus element concave to the front and a positive biconvex element, said lens having an equivalent focal length of 100 millimeters when constructed according to the parameters in the following table:

| Element | N | V | Radius mm | Thickness or Separation mm |
|---|---|---|---|---|
| 1 | 1.78821 | 47.5 | $R_1 = 52.093$ | $T_1 = 5.080$ |

| | | | $R_2 = -266.30$ | $S_1 = 6.862$ |
|---|---|---|---|---|
| 2 | 1.73252 | 51.7 | $R_3 = 38.752$ | $T_2 = 3.135$ |
| | | | $R_4 = 85.900$ | $S_2 = 0.983$ |
| | | | $R_5 = \infty$ | |
| 3 | 1.62552 | 35.8 | $R_6 = 28.267$ | $T_3 = 3.619$ |
| | | | $R_7 = -39.834$ | $S_3 = 6.483$ |
| 4 | 1.69864 | 30.1 | $R_8 = 158.81$ | $T_4 = 14.332$ |
| | | | $R_9 = -113.08$ | $S_4 = 8.495$ |
| 5 | 1.73252 | 51.7 | $R_{10} = -53.670$ | $T_5 = 3.053$ |
| | | | $R_{11} = 177.80$ | $S_5 = 8.202$ |
| 6 | 1.71324 | 54.0 | $R_{12} = -92.566$ | $T_6 = 4.515$ | wherein, from front to rear, the lens elements are numbered from 1-6, the corresponding indices of refraction, N, and Abbe numbers, V, are for the 0.5876 micron Helium line of the spectrum, the radii are numbered from $R_1$ to $R_{12}$, the thicknesses are numbered from $T_1$ to $T_6$ and the air spaces are numbered from $S_1$ to $S_5$.

4. A lens comprising from front to rear, a positive biconvex element, a positive meniscus element concave to the rear, a negative element, an aperture stop, a negative element, a positive meniscus element concave to the front and a positive biconvex element, said lens having an equivalent focal length of 100 millimeters when constructed according to the parameters in the following table:

| Element | N | V | Radius mm | Thickness or Separation mm |
|---|---|---|---|---|
| 1 | 1.78831 | 47.4 | $R_1 = 53.240$ | $T_1 = 5.130$ |
| | | | $R_2 = -248.90$ | $S_1 = 1.975$ |
| 2 | 1.73400 | 51.3 | $R_3 = 41.102$ | $T_2 = 3.080$ |
| | | | $R_4 = 84.269$ | $S_2 = 2.740$ |
| 3 | 1.62588 | 35.7 | $R_5 = 1505.0$ | $T_3 = 6.003$ |
| | | | $R_6 = 27.657$ | $S_3 = 7.411$ |
| 4 | 1.69895 | 30.1 | $R_7 = -38.719$ | $T_4 = 12.888$ |
| | | | $R_8 = 202.20$ | $S_4 = 3.677$ |
| 5 | 1.73400 | 51.3 | $R_9\ -113.07$ | $T_5 = 2.823$ |
| | | | $R_{10} = -48.741$ | $S_5 = 16.881$ |
| 6 | 1.71300 | 53.8 | $R_{11} = 196.55$ | $T_6 = 4.394$ |
| | | | $R_{12} = -92.355$ | | wherein, from front to rear, the lens elements are numbered from 1-6, the corresponding indices of refraction, N, and Abbe numbers, V, are for the 0.5876 micron Helium line of the spectrum, the radii are numbered from $R_1$ to $R_{12}$, the thicknesses are numbered from $T_1$ to $T_6$ and the air spaces are numbered from $S_1$ to $S_5$.

* * * * *